United States Patent [19]

Yoshimura et al.

[11] Patent Number: 4,519,431*
[45] Date of Patent: May 28, 1985

[54] STYRENE-BUTADIENE COPOLYMERS WITH HIGH STYRENE CONTENT

[75] Inventors: Yoshito Yoshimura, Yokkaichi; Noboru Oshima, Suzuka; Isamu Shimizu, Kameyama; Shinsuke Yamaguchi, Tokyo; Tatsuo Fujimaki; Tomoharu Yamada, both of Higashimurayama; Seisuke Tomita, Tokorozawa, all of Japan

[73] Assignees: Bridgestone Tire Company Limited; Japan Synthetic Rubber Co., Ltd., both of Tokyo, Japan

[21] Appl. No.: 632,270

[22] Filed: Jul. 19, 1984

Related U.S. Application Data

[63] Continuation of Ser. No. 444,027, Nov. 3, 1982, abandoned.

[30] Foreign Application Priority Data

Nov. 30, 1981 [JP] Japan .............................. 56-190650

[51] Int. Cl.$^3$ .............................................. B60C 11/00
[52] U.S. Cl. ........................... 152/209 R; 152/330 R; 525/332.9; 525/359.1; 525/371

[58] Field of Search ...................... 152/209 R, 330 R; 525/359.1, 332.9, 371

[56] References Cited

U.S. PATENT DOCUMENTS 3,956,232  5/1976  Uraneck et al. .................. 525/332.9
4,309,318  1/1982  Ahagon et al. ...................... 152/209
4,334,567  6/1982  Bond ................................... 152/209

*Primary Examiner*—Bernard Lipman
*Attorney, Agent, or Firm*—Sughrue, Mion, Zinn, Macpeak, and Seas

[57] ABSTRACT

A styrene-butadiene copolymer having a high styrene content is disclosed, which is obtained by polymerizing styrene and butadiene in a hydrocarbon solvent in the presence of an organolithium compound and, if necessary, a Lewis base and then coupling with a tin halide compound. This copolymer contains in its main chain at least 30 wt % of polymer having a tin-carbon bond and has a bound styrene content of more than 25 wt % but not more than 60 wt % and a content of vinyl bond in butadiene portion of not less than 30% but less than 50%.

9 Claims, No Drawings

STYRENE-BUTADIENE COPOLYMERS WITH HIGH STYRENE CONTENT

This application is a continuation of application Ser. No. 444,027, filed Nov. 3, 1982 now abandoned.

This invention relates to styrene-butadiene copolymers containing tin-carbon bond and having a high styrene content.

Heretofore, styrene-butadiene copolymers have widely been used as a rubber material for tires. Lately, it has become desirable for rubber materials to have a low rolling resistance and a high wet skid resistance (resistance on wet road surface) when used as a rubber for tire tread. This is because demands for the low fuel consumption automobiles and running have increased. Since rolling resistance is contrary to wet skid resistance, blends of different rubbers have been used to achieve harmony between both the above identified properties. However, the blends developed to date have not provided satisfactory.

Furthermore, even when changing the content of bound styrene in the styrene-butadiene copolymer, it is difficult to simultaneously coexist the wear resistance and wet skid resistance with properties such as rebound resilience relating to the rolling resistance of tire and the like.

It is, therefore, an object of the invention to provide styrene-butadiene copolymers having a high styrene content which improve the wet skid resistance and wear resistance without damaging the properties such as rebound resilience and the like.

The styrene-butadiene copolymers with high styrene content according to the invention are ones obtained by polymerizing styrene and butadiene in a hydrocarbon solvent in the presence of an organolithium compound and, if necessary, a Lewis base and then coupling with a tin halide compound. The copolymer according to the invention is characterized by containing in its main chain at least 30% by weight of a polymer having tin-carbon bond, and having a bound styrene content of more than 25% by weight but not more than 60% by weight and a content of vinyl bond in butadiene portion of not less than 30% but less than 50%.

In the styrene-butadiene copolymer according to the invention, the content of the polymer having tin-carbon bond is necessary to be at least 30% by weight, preferably not less than 50% by weight. When the above content is less than 30% by weight, the rebound resilience and fracture properties lower.

As the tin-carbon bond, tin-styryl bond and tin-butadienyl bond are existent in the styrene-butadiene copolymer after the coupling with tin halide. Particularly, the tin-butadienyl bond is excellent in the rebound resilience and fracture properties, low in the viscosity during the kneading, and excellent in the workability as compared with the tin-styryl bond.

The content of the polymer having tin-carbon bond is easily measured from high molecular weight components in a bimodal molecular weight distribution as measured by a gel permeation chromatography (GPC).

In the styrene-butadiene copolymer according to the invention, the content of bound styrene is more than 25% by weight but not more than 60% by weight, preferably not less than 30% by weight but less than 50% by weight, more particularly more than 40% by weight but less than 50% by weight. When the bound styrene content is not more than 25% by weight, the wet skid resistance is insufficient, while when the content exceeds 60% by weight, the rebound resilience and fracture properties lower.

Furthermore, the content of vinyl bond in butadiene portion of the copolymer according to the invention is not less than 30% but less than 50%, preferably more than 40% but less than 50%. When the content of vinyl bond is less than 30%, the wet skid resistance is insufficient and the rebound resilience is poor due to the presence of a large amount of block polystyrene (not less than 20% of total styrene). While, when the content of vinyl bond is not less than 50%, the fracture properties and wear resistance lower.

In the styrene-butadiene copolymer according to the invention, it is required to bond styrene unit with butadiene unit at substantially random. For this end, it is necessary that the content of block styrene in total bound styrene is not more than 20%, preferably not more than 10% as measured by a method described by I. M. Kolthoff et al in J. Polymer Sci., Vol. 1, 429 (1946).

The Mooney viscosity of the copolymer is not particularly critical, but its $ML_{1+4}(100°\ C.)$ is preferable within a range of 20–150.

The styrene-butadiene copolymer according to the invention is obtained by copolymerizing 1,3-butadiene with styrene in a hydrocarbon solvent in the presence of an organolithium compound as an initiator and, if necessary, a Lewis base and then coupling the resulting living polymer with a tin halide compound.

As the organolithium compound, mention may be made of alkyl lithiums such as methyllithium, ethyllithium, n-butyllithium, sec-butyllithium, tert-butyllithium and so on; amyllithium, phenyllithium, tolyllithium, vinyllithium, propenyllithium, tetramethylene dilithium, pentamethylene dilithium, hexamethylene dilithium, decamethylene dilithium and the like. The Lewis base is used for adjusting the microstructure of butadiene portion, an example of which includes ethers such as ethyl ether, amyl ether, octyl ether, tetrahydrofuran, dioxane, ethylene glycol dimethyl ether, ethylene glycol diethyl ether, ethylene glycol dibutyl ether, diethylene glycol dimethyl ether, diethylene glycol diethyl ether, diethylene glycol dibutyl ether, triethylene glycol dimethyl ether, triethylene glycol diethyl ether, tetraethylene glycol dimethyl ether, 2-methoxy tetrahydrofuran 2-methoxymethyl tetrahydrofuran, 2,5-dimethoxymethyl tetrahydrofuran and the like; and tertiary amines such as triethylamine, N,N,N',N'-tetramethylethylene diamine, triethylene diamine, N-methylmorpholine, N-ethylmorpholine and the like.

The coupling reaction is performed at a temperature of 30° to 110° C. The tin halide compound is used in an amount of 0.2 to 3 equivalent of halogen atom per 1 equivalent of lithium atom existent in the terminal of the polymer.

As the tin halide compound, mention may be made of tin tetrachloride, tin tetrabromide, tin methyl trichloride, tin butyl trichloride, tin dimethyl dichloride, tin dibutyl dichloride, tin dichloride, bis(trichlorostannyl)ethane and the like.

Particularly, in order to selectively produce the copolymer inclusive of the polymer having tin-butadienyl bond, a small amount, concretely 0.5–100 mole, preferably 1–50 mole per 1 gram atom equivalent of lithium in the organolithium initiator of 1,3-butadiene is added so as to form butadienyl lithium in the terminal of the living polymer after the completion of copolymerization reaction and before the coupling reaction with the tin halide compound.

The styrene-butadiene copolymer according to the invention is used alone or in a blend with natural rubber and/or a synthetic rubber for use in tires as well as rubber spring, belt, hose and other industrial goods. In this case, the copolymer or its rubber blend is extended with oil, added with additives usually used for vulcanizate and then vulcanized, if necessary.

The following examples are given in illustration of the invention and are not intended as limitations thereof. Moreover, the measurement of each rubber properties is made by the following method.

The tensile properties were measured according to the method of JIS K-6301. The wet skid resistance was measured by means of a portable skid tester, and the rebound resilience as an index for the rolling resistance was measured from Dunlop resilience at 70° C. The wear was measured by means of Pico type abrasion machine. The microstructure was determined by an infrared spectrophotometry. And also, the content of bound styrene was determined from a calibration curve based on absorption of phenyl group at 699 cm$^1$ by the infrared spectrophotometry.

EXAMPLES 1-4, COMPARATIVE EXAMPLES 1-5

Into a reaction vessel of 5 l capacity were charged cyclohexane, 1,3-butadiene, styrene and tetrahydrofuran in predetermined amounts as shown in the following Table 1 under nitrogen atmosphere. After the temperature of the resulting mass was adjusted to the predetermined initiation temperature, n-butyllithium was added to perform polymerization under heat insulation. After 30 minutes, the conversion rate for polymerization reached to 100%.

Then, a small amount of 1,3-butadiene was added to form butadienyllithium in the terminal of the polymer and thereafter tin tetrachloride was added to perform coupling reaction for 30 minutes. In Example 4, however, the coupling reaction with tin tetrachloride was performed without adding additional 1,3-butadiene. The resulting polymer solution was added with 2,6-di-tert-butyl p-cresol, subjected to steam stripping to perform the removal of solvent, and dried on a roll heated at 110° C. to obtain a polymer.

This polymer was mixed with other ingredients according to the compounding recipe shown in the following Table 2 by means of brabender and roll and then vulcanized at 145° C. for 35 minutes. The properties of the polymer and vulcanizate are shown in the following Table 3.

TABLE 1

|  | Example 4 | Example 1 | Example 2 | Example 3 | Comparative Example 1 | Comparative Example 2 | Comparative Example 3 | Comparative Example 4 | Comparative Example 5 |
|---|---|---|---|---|---|---|---|---|---|
| cyclohexane (g) | 2250 | 2250 | 2250 | 2250 | 2250 | 2250 | 2250 | 2250 | 2250 |
| 1,3-butadiene (g) | 290 | 320 | 285 | 250 | 395 | 170 | 285 | 35 | 35 |
| styrene (g) | 210 | 175 | 210 | 245 | 100 | 325 | 210 | 10 | 10 |
| tetrahydrofuran (g) | 10.1 | 9.0 | 10.1 | 13.0 | 7.9 | 8.0 | 13.8 | 2 | 1.1 |
| n-butyllithium (g) | 0.31 | 0.30 | 0.30 | 0.32 | 0.29 | 0.33 | 0.31 | .29 | .0 |
| Polymerization temperature* (°C.) | 15→77 | 20→78 | 15→78 | 10→70 | 25→85 | 10→70 | 5→65 | 0→90 | 5→78 |
| Conversion rate (%) | 100 | 100 | 100 | 100 | 100 | 100 | 00 | 00 | 0 |
| additionally added butadiene (g) | 0 | 5 | 5 | 5 | 5 | 5 |  |  |  |
| coupling agent SnCl$_4$ (g) | 0.175 | 0.175 | 0.175 | 0.175 | 0.175 | 0.175 | 0.175 | .175 | .050 |

*Numerical value shows polymerization initiation temperature→maximum access temperature.

TABLE 2

|  | part by weight |
|---|---|
| polymer | 100 |
| carbon black HAF | 0 |
| stearic acid |  |
| zinc white |  |
| sulfur |  |
| vulcanization accelerator NS* | 5 |

*n-tert-butyl-2-benzothiazyl sulfenamide

TABLE 3

|  | Example 4 | Example 1 | Example 2 | Example 3 | Comparative Example 1 | Comparative Example 2 | Comparative Example 3 | Comparative Example 4 | Comparative Example 5 |
|---|---|---|---|---|---|---|---|---|---|
| Mooney viscosity (ML$_{1+4}$ 100° C.) | 60 | 60 | 59 | 60 | 61 | 60 | 1 | 9 | 3 |
| bound styrene (%) | 42 | 35 | 42 | 49 | 20 | 5 | 2 | 2 |  |
| microstructure (%) cis/vinyl/trans | 21/44/35 | 20/45/35 | 21/44/35 | 21/44/35 | 20/45/35 | 20/45/35 | 0/70/20 | 12/20/48 | 1, 44/35 |
| Content of polymer having tin-carbon bond (%) | 57 | 60 | 60 | 61 | 60 | 58 | 2 | 9 | 2 |
| Properties of vulcanizate |  |  |  |  |  |  |  |  |  |
| 300% modulus (kg · f/cm$^2$) | 155 | 165 | 168 | 165 | 159 | 68 | 7 | 50 | 5 |
| tensile strength (kg · f/cm$^2$) | 245 | 250 | 255 | 250 | 240 | 220 | 25 | 50 | 5 |
| elongation (%) | 420 | 405 | 400 | 400 | 450 | 330 | 30 | 400 | 0 |
| hardness (JIS-A) | 60 | 60 | 61 | 61 | 60 | 63 | 1 | 9 | 0 |
| rebound resilience 70° C. % | 69 | 72 | 71 | 70 | 72 | 63 | 7 | 5 | 7 |

TABLE 3-continued

|  | Example 4 | Example 1 | Example 2 | Example 3 | Comparative Example 1 | Comparative Example 2 | Comparative Example 3 | Comparative Example 4 | Comparative Example 5 |
|---|---|---|---|---|---|---|---|---|---|
| wet skid resistance* (indicated by index) | 120 | 115 | 120 | 125 | 100 | 130 | 125 | 105 | 120 |
| Pico wear** (indicated by index) | 120 | 110 | 120 | 130 | 100 | 90 | 85 | 110 | 110 |

*,**index value on the basis that Comparative Example 1 is 100. The larger the index value, the better the property.

As apparent from Table 3, the vulcanizates of Examples 1–4 have a well balance in the tensile strength, rebound resilience (70° C.), wet skid resistance and wear resistance. On the other hand, Comparative Example 1 is excellent in the rebound resilience but poor in the wet skid resistance and wear resistance. Comparative Example 2 is excellent in the wet skid resistance but poor in the rebound resilience, tensile strength and wear resistance. Comparative Example 3 is excellent in the wet skid resistance but poor in the tensile strength and wear resistance. Comparative Example 4 is poor in the rebound resilience. Comparative Example 5 is excellent in the wet skid resistance but poor in the rebound resilience and tensile strength.

Then, a rubber composition including each polymer of Examples 1–5 and Comparative Examples 1–4 was prepared according to the compounding recipe shown in the following Table 4 by means of a Banbury mixer and applied as a tread rubber to a radial tire for passenger car having a tire size of 165 SR 13 to manufacture a tire.

TABLE 4

|  | part by weight |
|---|---|
| polymer of Table 2 | 65 |
| natural rubber | 35 |
| carbon black ISAF | 48 |
| aromatic oil | 10 |
| zinc white | 4 |
| stearic acid | 2 |
| N—oxydiethylene-2-benzothiazyl sulfenamide | 0.4 |
| diphenylguanidine | 0.2 |
| dibenzothiazyl disulfide | 0.4 |
| sulfur | 2.0 |
| N—phenyl-N'—isopropyl-p-phenylenediamine | 1.0 |

In the above eight tread rubbers, tan δ at 0° C. and 60° C. was measured by means of a viscoelasticity measuring machine RMS 7200 made by Rheometrics Inc. under measuring conditions that shearing strain was 1% and frequency was 15 hrs, and the tensile strength (kg.f/cm$^2$) was measured according to JIS K-6301. The wet skid resistance, rolling resistance, wear resistance and running property on bad road were evaluated with respect to the eight tires. The measured results are shown in the following Table 5. Moreover, the evaluation of these properties was made as follows:

Wet skid resistance

A vehicle provided with the test tire was run on a wet concrete road having a water depth of 3 mm at a speed of 80 km/hr and thereafter subjected to rapid braking at the above speed. Then, a running distance required for completely stopping the vehicle was measured, from which the wet skid resistance was evaluated according to the following equation using the tire of Tire No. 5 (using the polymer of Comparative Example 1) as a control tire. The larger the the index value, the better the property.

$$\frac{\text{Running distance of control tire}}{\text{Running distance of test tire}} \times 100$$

Rolling resistance

The test tire subjected to an internal pressure of 1.7 kg/cm$^2$ was trained on a steel drum with a diameter of 1707.6 mm and a width of 350 mm, which was rotated by the driving of a motor, at a speed of 80 km/hr under JIS 100% load (385 kg) for 30 minutes and thereafter the rotating speed of the drum was raised to 100 km/hr. Then, the driving of the motor was stopped to run the drum by inertia, during which the rolling resistance of the tire to the drum at a speed of 50 km/hr was measured on a basis of deceleration speed of drum and time change. Next, a net rolling resistance of the tire was determined by subtracting the previously calculated drum resistance from the measured value. The rolling resistance was indicated by an index according to the following equation using the tire of Tire No. 5 as a control tire. The larger the index value, the better the property.

$$\frac{\text{Rolling resistance of control tire}}{\text{Rolling resistance of test tire}} \times 100$$

Wear resistance

The test tire was run on an expressway over a distance of 10,000 km. Thereafter, the depth of the remaining tread grooves was measured, from which a running distance required for obtaining wear loss of 1 mm was evaluated by an index using the tire of Tire No. 5 as a control tire. The larger the index value, the better the property.

Running property on bad road

After the test tire was run on a road containing 80% of gravelled road over a distance of 20,000 km, the presence of external injury and cut failure on the tread surface was observed.

TABLE 5

| | Tire No. | | | | | | | | |
|---|---|---|---|---|---|---|---|---|---|
| | 1 | 2 | 3 | 4 | 5 | 6 | 7 | 8 | 9 |
| | Polymer used | | | | | | | | |
| | Example 1 | Example 2 | Example 3 | Example 4 | Comparative Example 1 | Comparative Example 2 | Comparative Example 3 | Comparative Example 4 | Comparative Example 5 |
| tan δ (0° C.) | 0.540 | 0.562 | 0.587 | 0.555 | 0.360 | 0.613 | 0.604 | 0.377 | 0.421 |

TABLE 5-continued

| | Tire No. | | | | | | | | |
|---|---|---|---|---|---|---|---|---|---|
| | 1 | 2 | 3 | 4 | 5 | 6 | | | |
| | Polymer used | | | | | | | | |
| | Example 1 | Example 2 | Example 3 | Example 4 | Comparative Example 1 | Comparative Example 2 | Comparative Example 3 | Comparative Example 4 | Comparative Example 5 |
| tan δ (60° C.) | 0.117 | 0.120 | 0.126 | 0.124 | 0.115 | 0.165 | 0.133 | .145 | .140 |
| tensile strength (kg · f/cm$^2$) | 265 | 270 | 260 | 255 | 245 | 210 | 240 | 50 | 40 |
| wet skid resistance | 111 | 115 | 122 | 112 | 100 | 119 | 116 | 12 | 10 |
| rolling resistance | 101 | 98 | 95 | 95 | 100 | 31 | 31 | 5 | 6 |
| wear resistance | 110 | 110 | 115 | 110 | 100 | 95 | 90 | 30 | 30 |
| running property on bad road | good | good | good | good | Cut failure and external injury occurred | Cut failure and external injury largely occurred | good | good | Cut failure and external injury occurred |

It can be seen from Table 5 that in the tires of Tire Nos. 1–4, the wet skid resistance and the rolling resistance can advantageously be coexisted with each other without degrading the wear resistance and the running property on bad road. In the tire of Tire No. 7 (using the polymer of Comparative Example 3), the balance between the wet skid resistance and the rolling resistance is substantially equal to that of Tire No. 4 (using the polymer of Example 4), but the wear resistance lowers, so that this tire can not be put to practical use.

What is claimed is:

1. A styrene-butadiene copolymer prepared by the process comprising:
   (1) polymerizing styrene and butadiene in a hydrocarbon solvent in the presence of an organolithium compound and
   (2) coupling with a tin halide selected from the group consisting of tin tetrachloride, tin tetrabromide, tin methyl trichloride, tin butyl trichloride, tin dimethyl dichloride, tin dibutyl dichloride, tin dichloride and bis(trichlorostannyl)ethane, wherein said copolymer has the following characteristics: (a) at least 30% by weight of the copolymer has at least two tin-carbon bonds in its molecular chain between styrene-butadiene polymer chains; (b) a bound styrene content of more than 25% by weight but not more than 60% by weight; and (c) a vinyl content in the butadiene portion of not less than 30% but less than 50%.

2. The styrene-butadiene copolymer according to claim 1, wherein at least one of said tin-carbon bonds in said styrene-butadiene copolymer is a tin-butadienyl bond.

3. The styrene-buradiene copolymer according to claim 1, wherein said coupling is performed at a temperature of 30°–110° C. and said tin halide is used in an amount of 0.2 to 3 equivalents of halogen atom per 1 equivalent of lithium atom existing at the terminal of said copolymer.

4. The styrene-butadiene copolymer of claim 1 in which step (1) was carried out additionally in the presence of a Lewis base.

5. A pneumatic radial tire containing a tread, wherein said tread comprises: a styrene-butadiene copolymer prepared by the process comprising:
   (1) polymerizing styrene and butadiene in a hydrocarbon solvent in the presence of an organolithium compound and
   (2) coupling with a tin halide selected from the group consisting of tin tetrachloride, tin tetrabromide, tin methyl trichloride, tin butyl trichloride, tin dimethyl dichloride, tin dibutyl dichloride, tin dichloride and bis(trichlorostannyl)ethane, wherein said copolymer has the following characteristics: (a) at least 30% by weight of the copolymer has at least two tin-carbon bonds in its molecular chain between styrene-butadiene polymer chains; (b) a bound styrene content of more than 25% by weight but not more than 60% by weight; and (c) a vinyl content in the butadiene portion of not less than 30% by less than 50%.

6. The pneumatic radial tire according to claim 5, wherein at least one of said tin-carbon bonds in said styrene-butadiene copolymer is a tin-butadienyl bond.

7. The styrene-butadiene copolymer according to claim 1, wherein 0.5–100 mole of 1,3-butadiene per 1 gram atom of lithium in the organolithium compound is added after step (1) and before step (2).

8. The pneumatic radial tire according to claim 5, wherein 0.5–100 mole of 1,3-butadiene per 1 gram atom of lithium in the organolithium compound is added after step (1) and before step (2).

9. The pneumatic radial tire of claim 5 in which step (1) was carried out additionally in the presence of a Lewis base.

* * * * *